United States Patent

Okayama

[19]

[11] Patent Number: 6,128,684
[45] Date of Patent: Oct. 3, 2000

[54] BUS BRIDGE

[75] Inventor: Yoshimitsu Okayama, Tokyo, Japan

[73] Assignee: NEC Corporation, Tokyo, Japan

[21] Appl. No.: 09/106,207

[22] Filed: Jun. 29, 1998

[30] Foreign Application Priority Data

Jun. 30, 1997 [JP] Japan .................................. 9-174187

[51] Int. Cl.$^7$ .................................................. G06F 12/00
[52] U.S. Cl. .................... 710/109; 710/126; 710/127; 710/128; 710/129; 710/130; 710/113; 711/200; 711/3; 711/203; 711/206; 711/207; 711/209
[58] Field of Search ...................................... 710/109, 131, 710/126–130; 711/3, 200, 202, 203, 207, 206, 209, 213, 217, 221; 11/205; 712/226

[56] References Cited

U.S. PATENT DOCUMENTS

| | | | |
|---|---|---|---|
| 4,442,502 | 4/1984 | Friend et al. | 710/131 |
| 5,392,410 | 2/1995 | Liu | 711/3 |
| 5,479,627 | 12/1995 | Khalidi et al. | 711/205 |
| 5,634,027 | 5/1997 | Saito | 395/403 |
| 5,784,708 | 7/1998 | Bridges et al. | 711/207 |
| 5,884,027 | 3/1999 | Garbus et al. | 709/250 |
| 5,889,970 | 3/1999 | Horan et al. | 710/126 |
| 5,913,045 | 6/1999 | Gillespie et al. | 710/129 |
| 5,933,626 | 8/1999 | Mahalingaiah et al. | 712/226 |
| 5,937,435 | 8/1999 | Dobbek et al. | 711/202 |

FOREIGN PATENT DOCUMENTS

| | | |
|---|---|---|
| 60-89266 | 5/1985 | Japan . |
| 5-88891 | 4/1993 | Japan . |
| 5-143456 | 6/1993 | Japan . |
| 6-89257 | 3/1994 | Japan . |
| 6-187286 | 7/1994 | Japan . |
| 7-281947 | 10/1995 | Japan . |
| 8-227383 | 9/1996 | Japan . |
| 8-314850 | 11/1996 | Japan . |
| 8-335188 | 12/1996 | Japan . |
| 9-91199 | 4/1997 | Japan . |

*Primary Examiner*—Ayaz R. Sheikh
*Assistant Examiner*—Eric S. Thlang
*Attorney, Agent, or Firm*—Foley & Lardner

[57] ABSTRACT

Disclosed is a bus bridge for mutually connecting a memory bus having memories connected thereto and an I/O bus having plural I/O devices connected thereto, which comprises a conversion table in which pairs of entry and physical address are included and which is divided into a fixed part and a refillable part; an address conversion means for converting a logical address supplied from the I/O device to a physical address supplied to the memory, while selectively using the fixed part or the refillable part in accordance with whether the logical address is in address remapping space or in I/O-TBL space; and refilling means for refilling the contents of the refillable part from a mother address conversion table on a memory in case that the logical address is in the I/O-TBL space and the entry corresponding to the logical address does not exist in the refillable part.

5 Claims, 13 Drawing Sheets

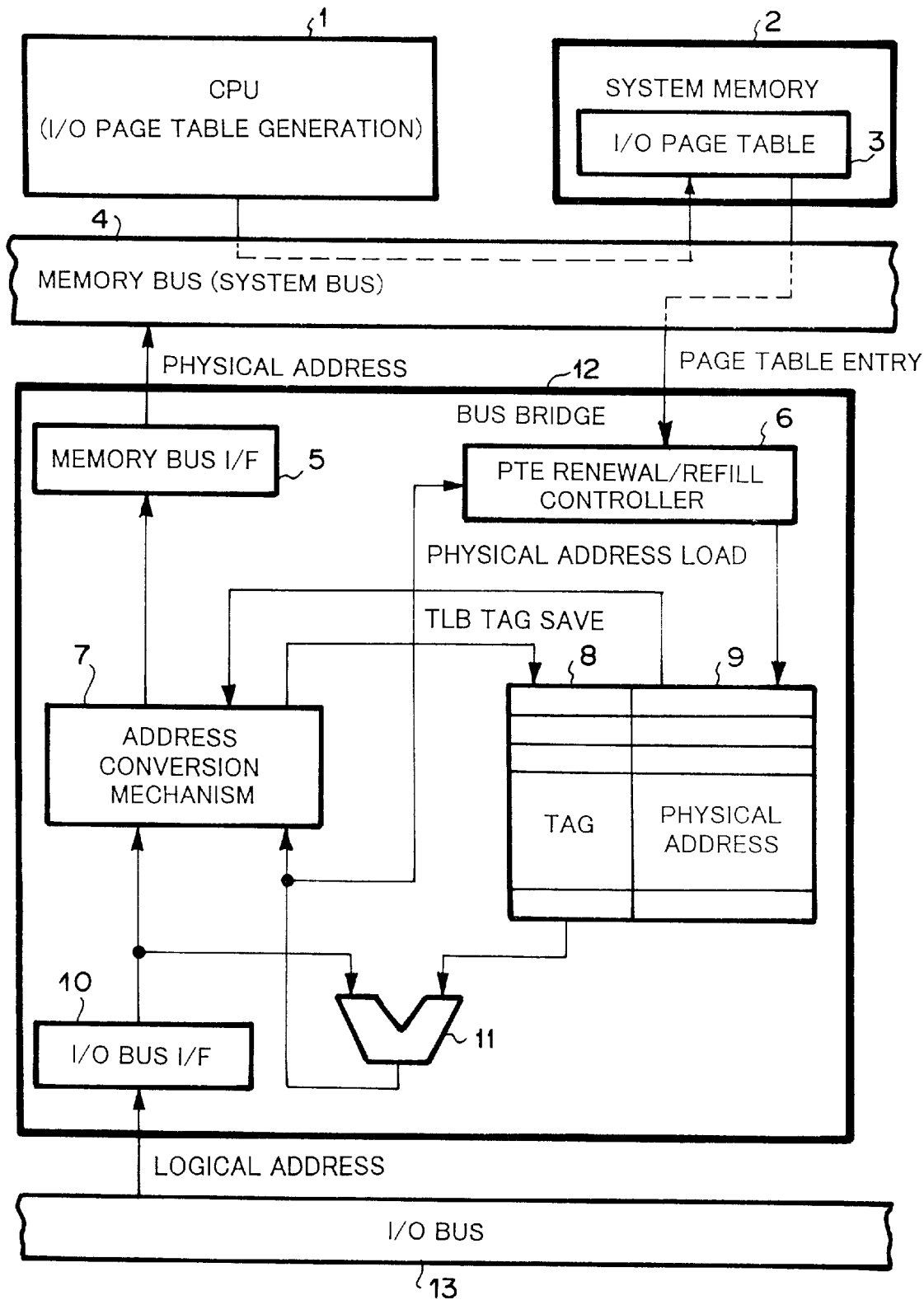

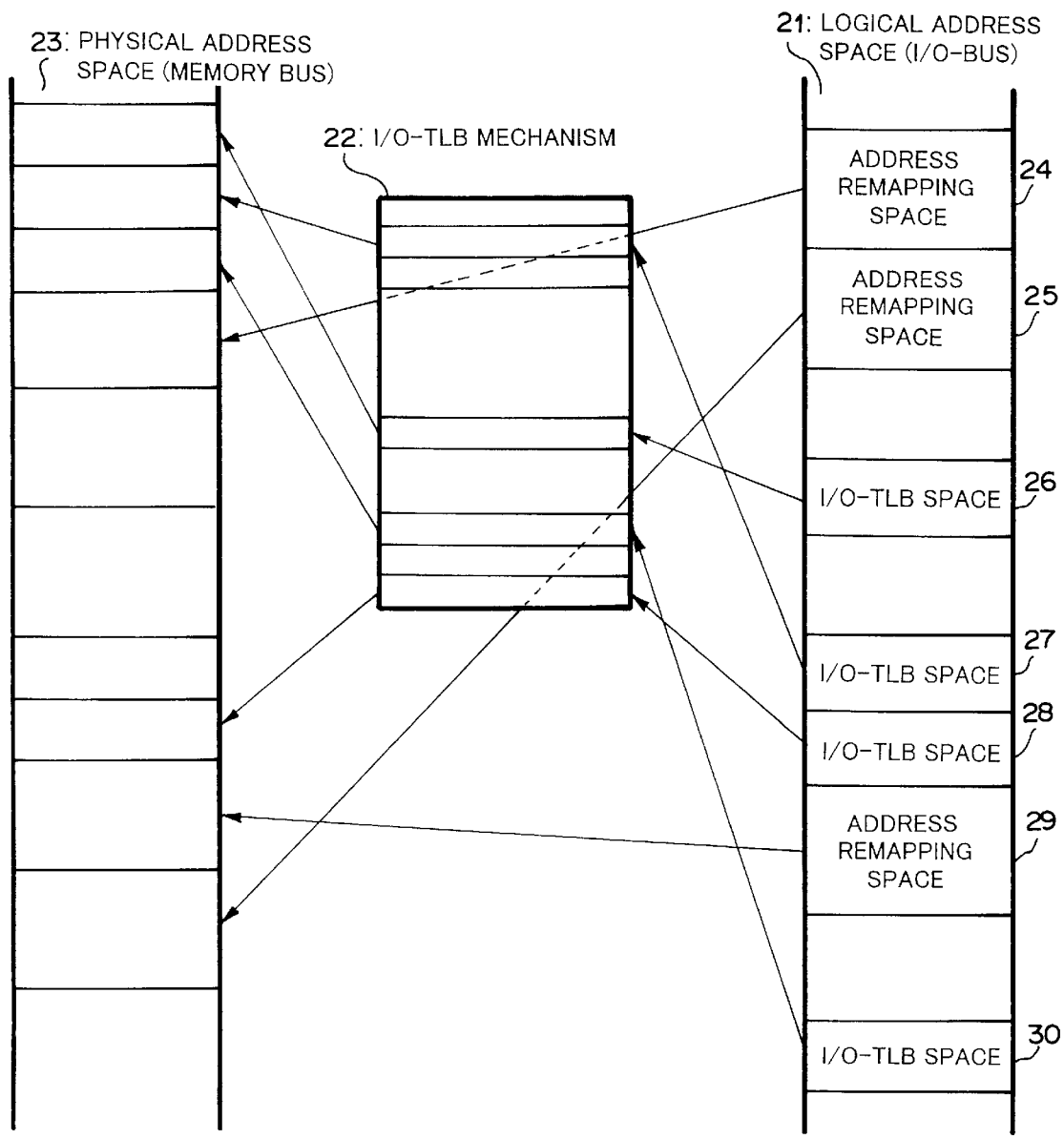

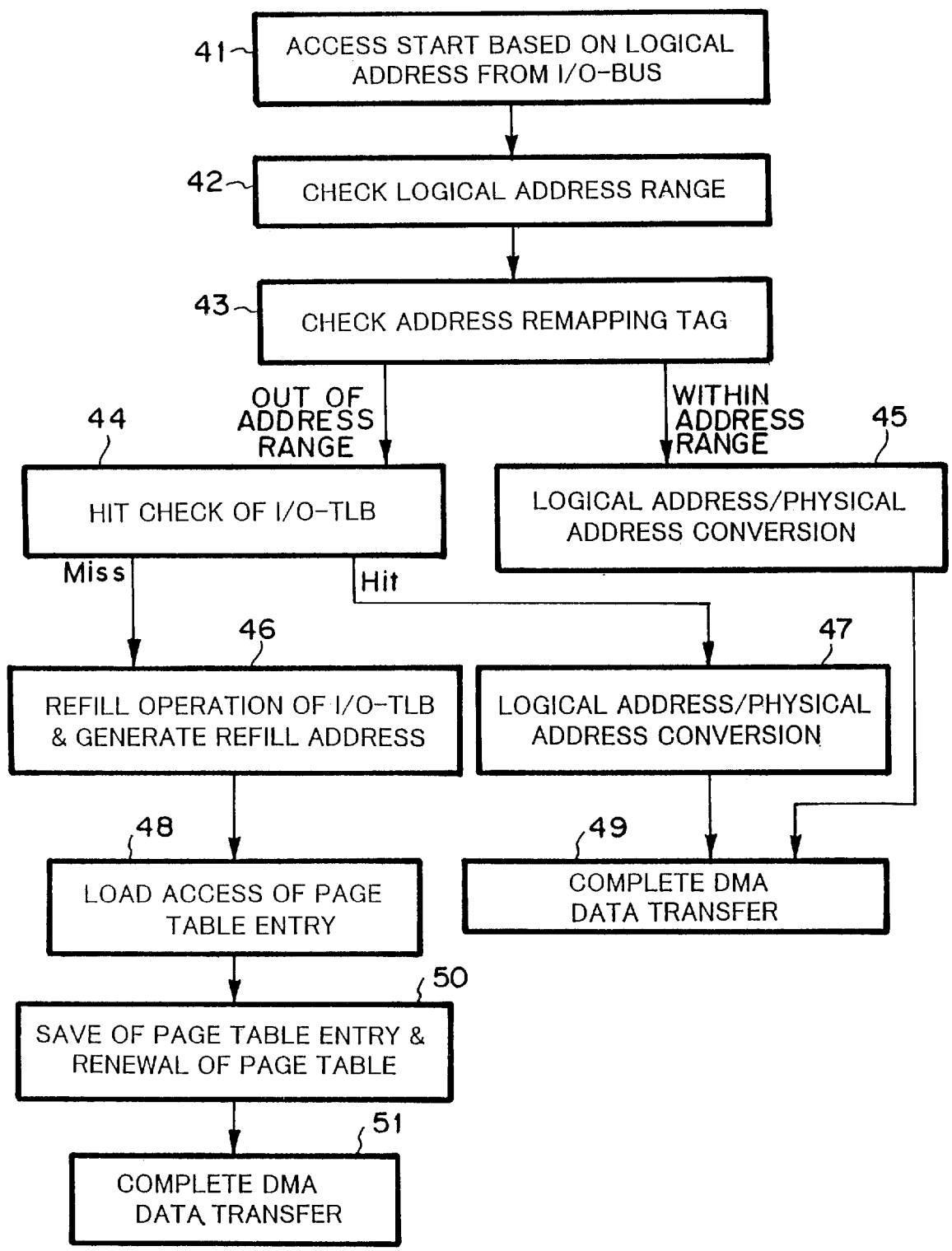

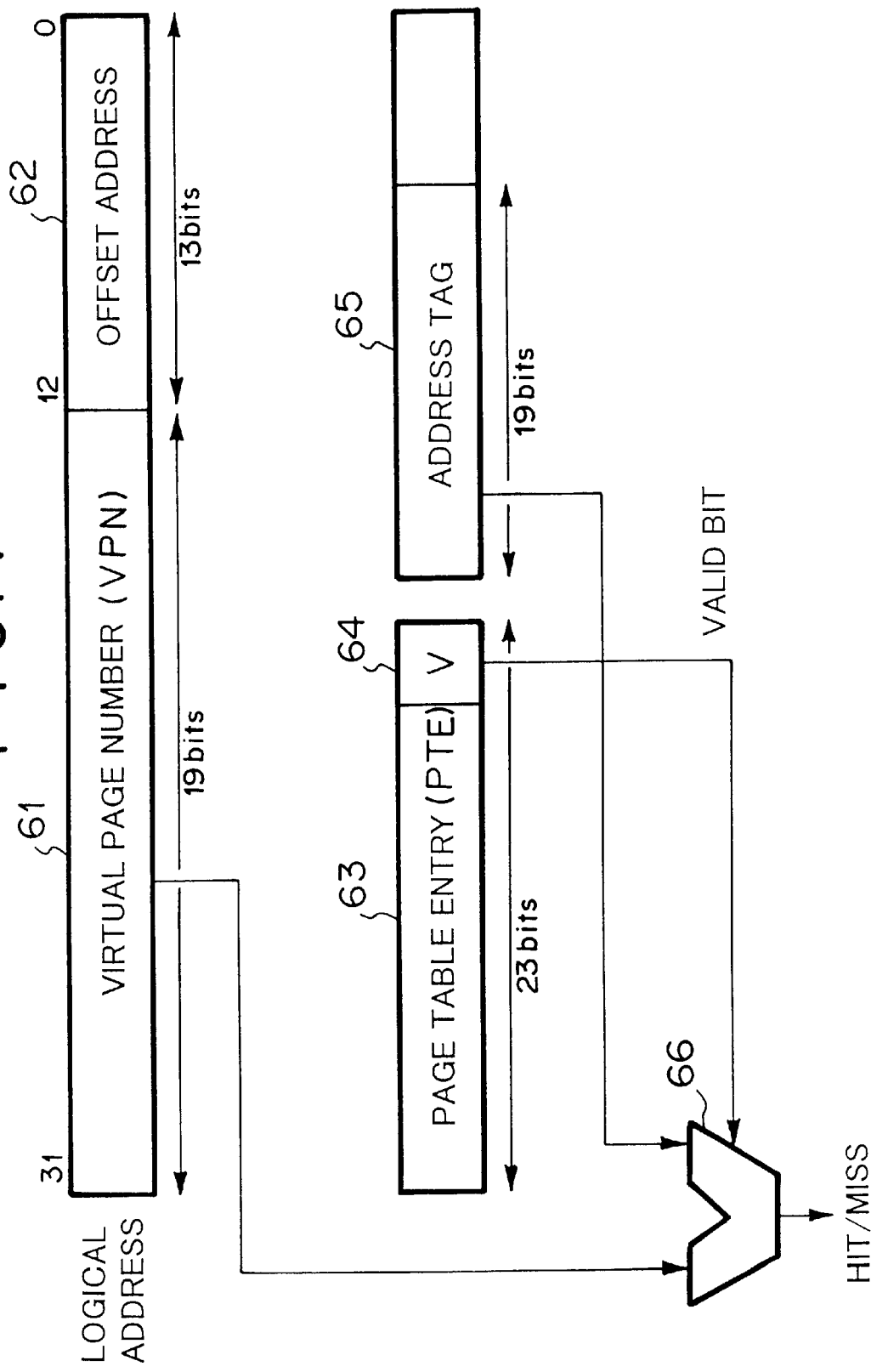

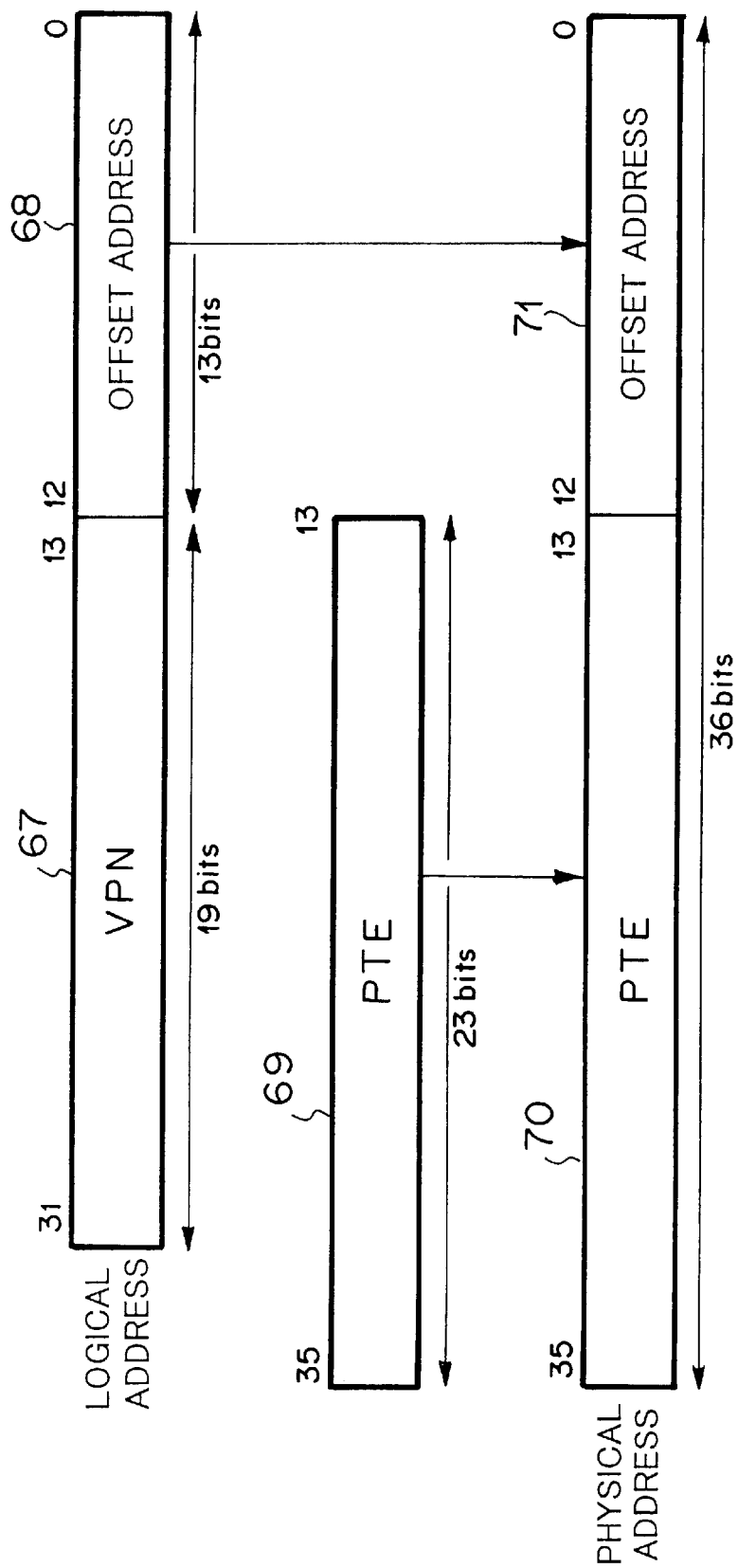

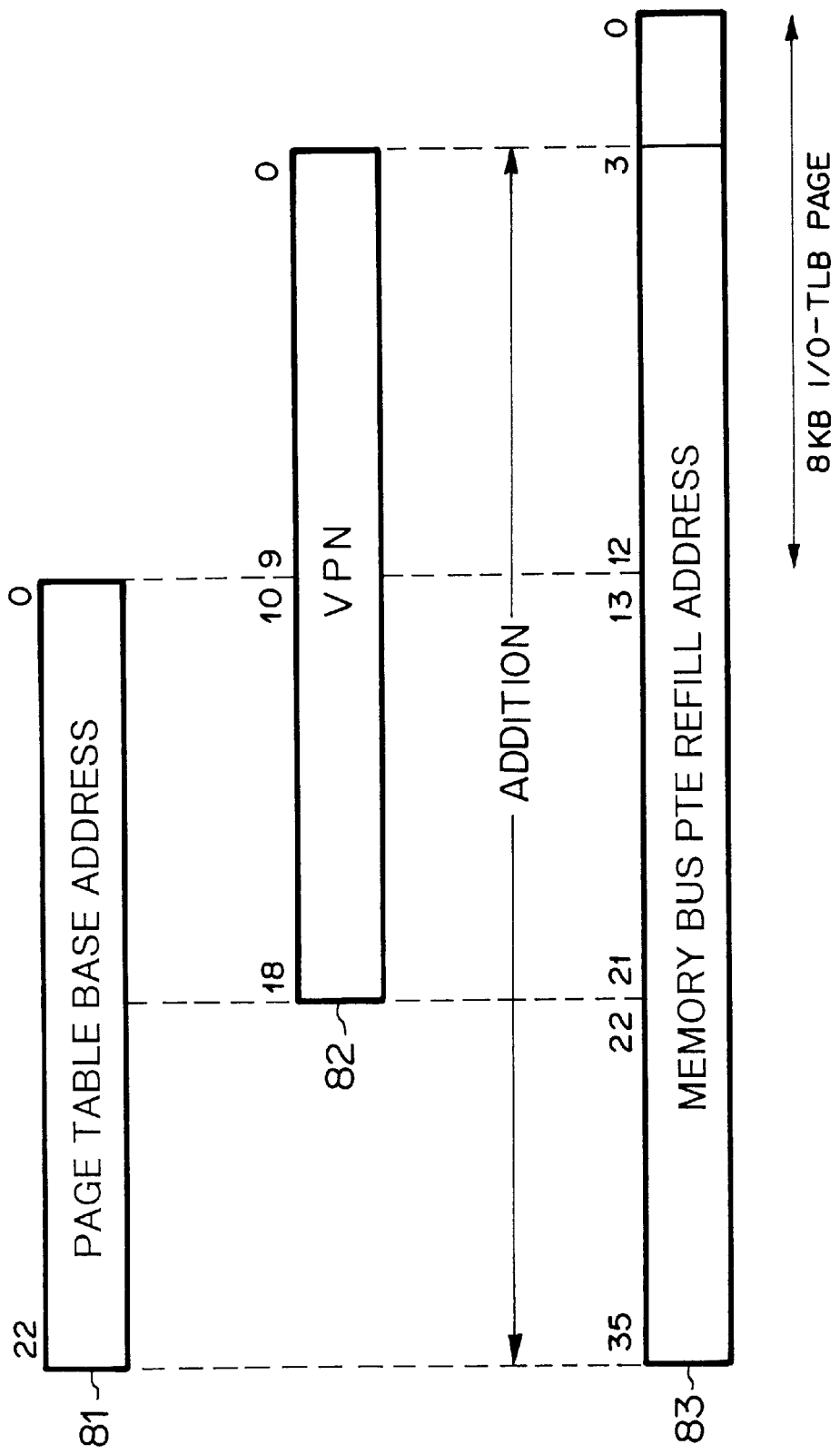

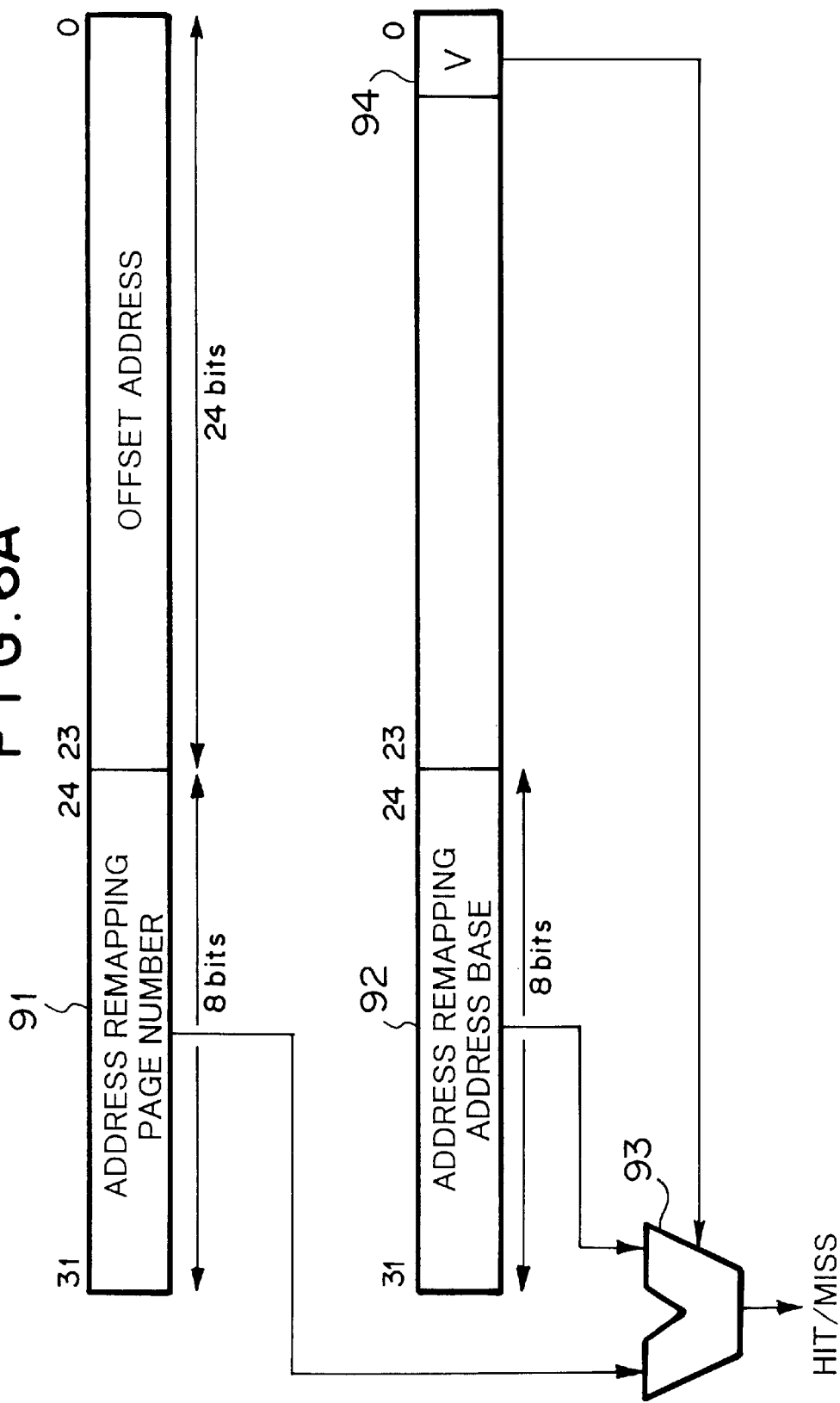

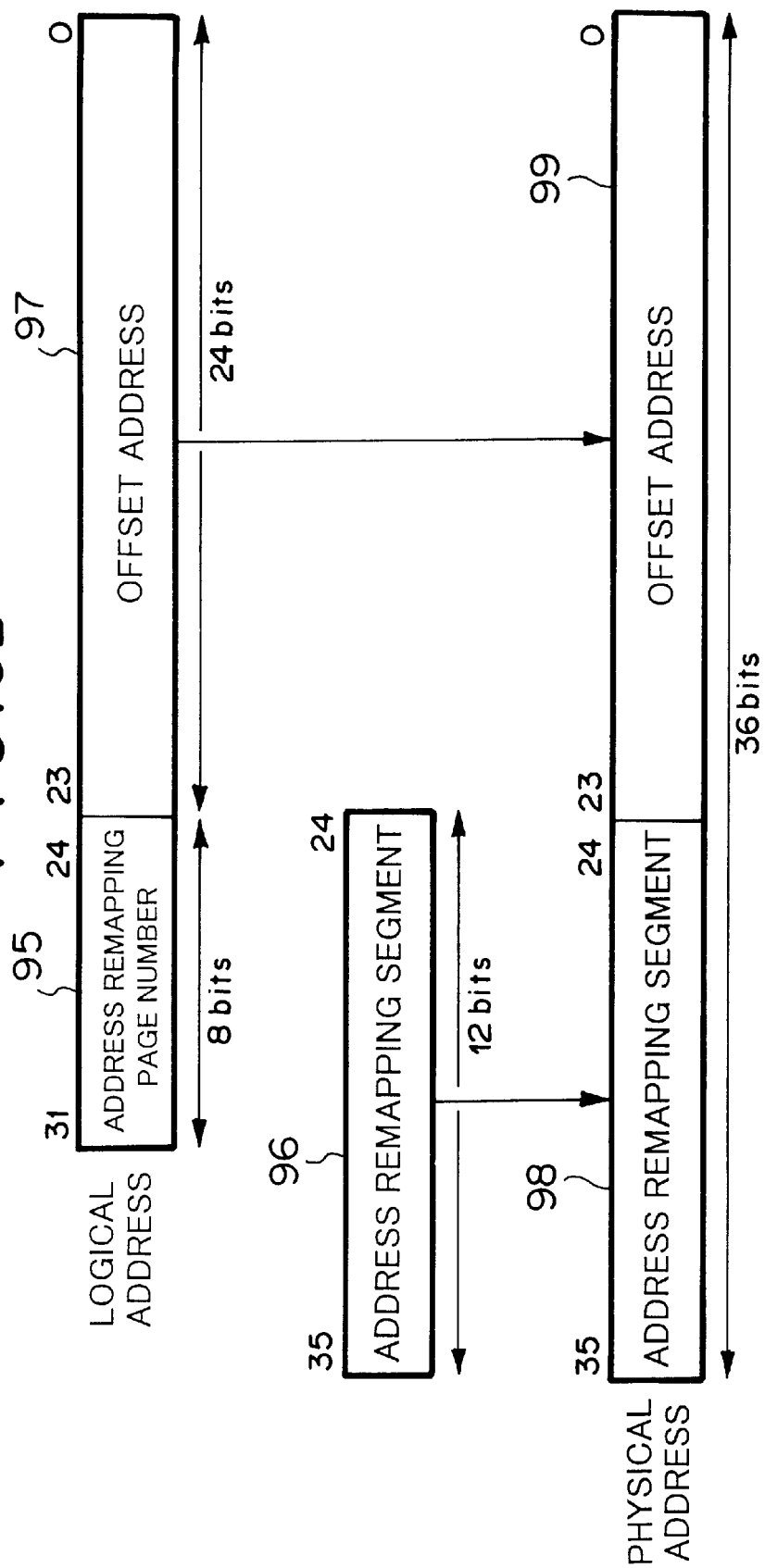

BUS BRIDGE

BACKGROUND OF THE INVENTION

1. Field of the Invention

The present invention relates to an information processing device and particularly, to an I/O bus bridge having an address conversion mechanism for mutually connecting a memory bus and an I/O bus.

2. Description of the Related Art

A conventional bus bridge is disclosed in JPA-08-314850. This conventional bus bridge is connected with a system bus and an I/O bus, included in a computer system, and used for controlling an access between the respective buses. It includes storage means and access control means. When a write-in access is made from the system bus side to an I/O equipment on the I/O bus, the access control means stores the contents of the write-in access into the storage means and releases the system bus if the I/O equipment is in an inaccessible state, and carries out the write-in access to the I/O equipment on the basis of the contents of the write-in access stored in the storage means if the I/O equipment is switched to an accessible state. Another bus bridge of this kind is also disclosed in JPA-09-089257.

However, the conventional bus bridges such as the bus bridges disclosed in the above publication have the following disadvantages.

A first disadvantage resides in that in a transfer operation of a logical address from the I/O device to the memory bus, a large loss may occur when the transfer of the logical address fails because there is not provided any address conversion mechanism for converting the logical address to an address on the memory bus, that is, a physical address. Alternatively, even if an address conversion mechanism is provided, a large loss may still occur when the transfer fails because this mechanism is a simple TLB (Translation Lookaside Buffer) type mechanism. This is because the address conversion mechanism needs a relatively large resource and thus a cost-down requirement generally causes the address conversion mechanism not to be mounted particularly in a low-price device. Further, even when the address conversion mechanism is mounted, it is necessary to look up an address conversion table entry every time the failure occurs, and this loss makes a critical disadvantages in performance in many cases.

Here, the necessity of the address conversion in spite of the risk of the conversion loss will be explained.

First, the I/O bus generally has address lines which are narrower than the memory bus (system bus). Therefore, if it is not modified, it cannot make an access to an upper-class physical address which exceeds an addressing range of the I/O address.

Secondly, if the address conversion mechanism can be managed on a page basis as in the case of a TLB system serving as an address conversion mechanism which is adopted in a microprocessor, the memory access from the I/O device and the TLB page of CPU can be managed as a pair. Accordingly, the management of the TLB of the CPU and the TLB of the I/O device can be unitarily managed, and this provides a high merit in portability to developments of software. Therefore, the address conversion mechanism has been used, particularly in a device to which a large number of I/O devices are connected.

Next, a second disadvantage will be explained.

Considering the operation of a single I/O device in the prior art, an indication of an access to a memory which is carried out at a time has a size which is much larger than the line size of an I/O cache and needs a transfer size of several K bytes or more. However, the line size of the I/O cache is generally set to several tens bytes such as 32 bytes or 64 bytes. Therefore, the bus bridge transfers the I/O cache of several tens bytes over and over again while repetitively making a miss.

However, the size of the entry of the address conversion table is generally set to several K bytes, and thus an address conversion miss occurs at a frequency which is much lower than the I/O cache. Accordingly, there is a large difference between the address conversion miss rate and the I/O cache miss rate in the memory access of the same I/O device. There was a technical theme on how the difference is decreased without largely increasing hardware scale. The reason is as follows. If an address conversion table and an I/O cache are contained on the assumption that the entry number of the address conversion table and the entry number of the I/O cache are set to the same hit rate, an extremely large amount of the entry number of the I/O cache must be prepared. Therefore, there cannot be realistically provided the entry number of the I/O cache which is assumed to have the same hit rate as the address conversion table without increasing hardware scale.

A third disadvantage is as follows. PTE (Page Table Entry) which is TLB-refilled due to I/O-TLB miss is normally smaller than the data size of one loading. As a result, the usage efficiency of the system bus which needs a throughput performance (for example, a multiprocessor bus) may be reduced. Further, when the length of data which are transferred by only one DMA is longer than the page size of I/O-TLB, a miss occurs on a page basis, and the refilling is carried every time such a miss occurs. This may cause deterioration in throughput performance.

A fourth disadvantage is as follows. Devices are classified into two types, one type being directed to a communication/multimedia type device which needs instantaneousness (hereinafter referred to as "latency type device"), and the other type being directed to a device which transfers data at the maximum rate until transfer of data of predetermined transfer bytes is completed once a DMA request is issued (hereinafterreferred to as "throughput type device"). The time interval of the DMA requests from the I/O bus is relatively long. In such a system that plural latency type devices and throughput type devices are connected to a bus bridge, when the plural throughput type devices use I/O-TLB as a logical address - physical address conversion mechanism once they start to operate, the throughput type device temporarily occupy I/O-TLB entry. In this case, even when a latency type device issues a DMA request, a miss necessarily occurs at I/O-TLB. If this state is continued at some times, there would occur such a situation that a prescribed latency performance cannot be satisfied.

SUMMARY OF THE INVENTION

Therefore, an object of the present invention is to provide a memory bus-I/O bus bridge which are provided with plural logical address/physical address conversion mechanisms meeting the characteristics of I/O devices and can selectively and properly use one of the logical address/physical address conversion mechanisms in accordance with an I/O device request, and which can suppress deterioration of a transfer performance due to address conversion miss while keeping portability on a software owing to the address conversion mechanisms.

In order to achieve the above object, a bus bridge according to the present invention is characterized by including plural logical address/physical address conversion mechanisms and in that one of the address conversion mechanisms is automatically selected on the basis of a logical address range of an I/O device in order to convert a logical address to a physical address indicated by the page thereof.

More specifically, a conversion table is stored on a system memory as I/O page table (reference numeral 3 in FIG. 1). A bus bridge (reference numeral 12 in FIG. 1) has as one of the address conversion mechanisms for converting a memory access address requested from the I/O device through an I/O bus (reference numeral 13 in FIG. 1) (hereinafter referred to as "logical address") to an access address indicating a real memory space on a memory bus (system bus)(reference numeral 4 in FIG. 1) (hereinafter referred to as "physical address"). This address conversion mechanism carries out an address conversion not only by using an I/O page table in a system memory, but also with a converter which functions as another conversion mechanism in a logical address tag (reference numeral 8 in FIG. 1) without using the I/O page table.

The internal construction of the address conversion mechanism of the bus bridge is as follows.

An /O bus I/F (reference numeral 10 in FIG. 1) has a function of holding or buffering a request address (logical address) from the I/O bus according to an I/O bus protocol. A logical address hit/miss check unit (reference numeral 11 in FIG. 1) serves to compare logical address information held in the I/O bus I/F 10 and the logical address tag (reference numeral 8 in FIG. 1) in bus bridge 12. If "hit is judged on the basis of the comparison information, the address conversion mechanism (reference numeral 7 in FIG. 1) uses the physical address data (reference numeral 9 in FIG. 1) corresponding to the logical address tag. On the other hand, if "miss" is judged on the basis of the comparison information, the address conversion mechanism registers it as the latest address tag into the logical address tag (reference numeral 8 in FIG. 1) and outputs an instruction to a PTE renewing/refilling controller (reference numeral 6 of FIG. 1) having a function for looking up the physical address corresponding to the logical address missed. The memory bus I/F (reference numeral 5 in FIG. 1) makes a bus access according to the system bus protocol by the converted address.

Further, in addition to one type for performing address conversion by looking up the I/O page table (reference numeral 3 in FIG. 1), there is a logical address tag (reference numeral 8 in FIG. 1) which uses another address conversion mechanism. Accordingly, it is not necessarily required to perform the address conversion using the I/O page table. That is, one of both the types may be automatically selected to perform the address conversion optimized from the view of the performance.

The bus bridge of the present invention is provided with plural logical address/physical address conversion mechanisms, each of which keeps the portability on formation of software, and one of the address conversion mechanisms is automatically selected by the logical address range of the I/O device, whereby the effect of the address conversion miss on the transfer performance can be reduced at the maximum level.

More specifically, the I/O page table is stored on the system memory, and the memory access address (physical address) on the memory bus which corresponds to the request address (logical address) on the I/O bus is stored in the entry in the I/O page table.

The I/O bus I/F has a function of holding or buffering the request address (logical address) from the I/O bus according to the I/O bus protocol. The logical address information held in I/O bus I/F and the internal logical address tag are compared by the logical address bit/miss check unit. On the basis of the result of the comparison information, if "hit" is judged, the physical address data (reference numeral 9 in FIG. 1) (this is the physical address itself, and this address is stored as data corresponding to the logical address tag) corresponding to the logical address tag is used. If a page attribute means use of the I/O page table and "miss" is judged, the address conversion mechanism has the function of newly registering the logical address tag held in I/O bus I/F as the latest address tag.

The PTE renewing/refilling controller has the function of performing the refilling operation for looking up (pulling) the physical address corresponding to the missed logical address as data from the system memory according to the miss instruction by the address conversion mechanism.

The physical address serving as the final result of the logical address/physical address conversion has a function of performing the bus access according to the protocol of the memory bus executed by the memory bus I/F.

BRIEF DESCRIPTION OF THE DRAWINGS

FIG. 1 is a diagram showing the construction of first and third embodiments of the present invention;

FIG. 2 is a diagram showing an example of the relationship between a logical DMA space and a physical DMA space in the present invention;

FIG. 3 is a diagram showing a logical address/physical address conversion flow of the present invention;

FIGS. 4A and 4B are diagrams showing a case where a physical address is generated from a logical address by an I/O-TLB mechanism in the present invention;

FIG. 5 is a diagram showing a refill address generation method when a miss is made in the I/O-TLB mechanism of the present invention;

FIGS. 6A and 6B are diagrams showing a case where a physical address is generated from a logical address by an address re-mapping mechanism of the present invention;

DETAILED DESCRIPTION OF THE PREFERRED EMBODIMENTS

Figure 7:
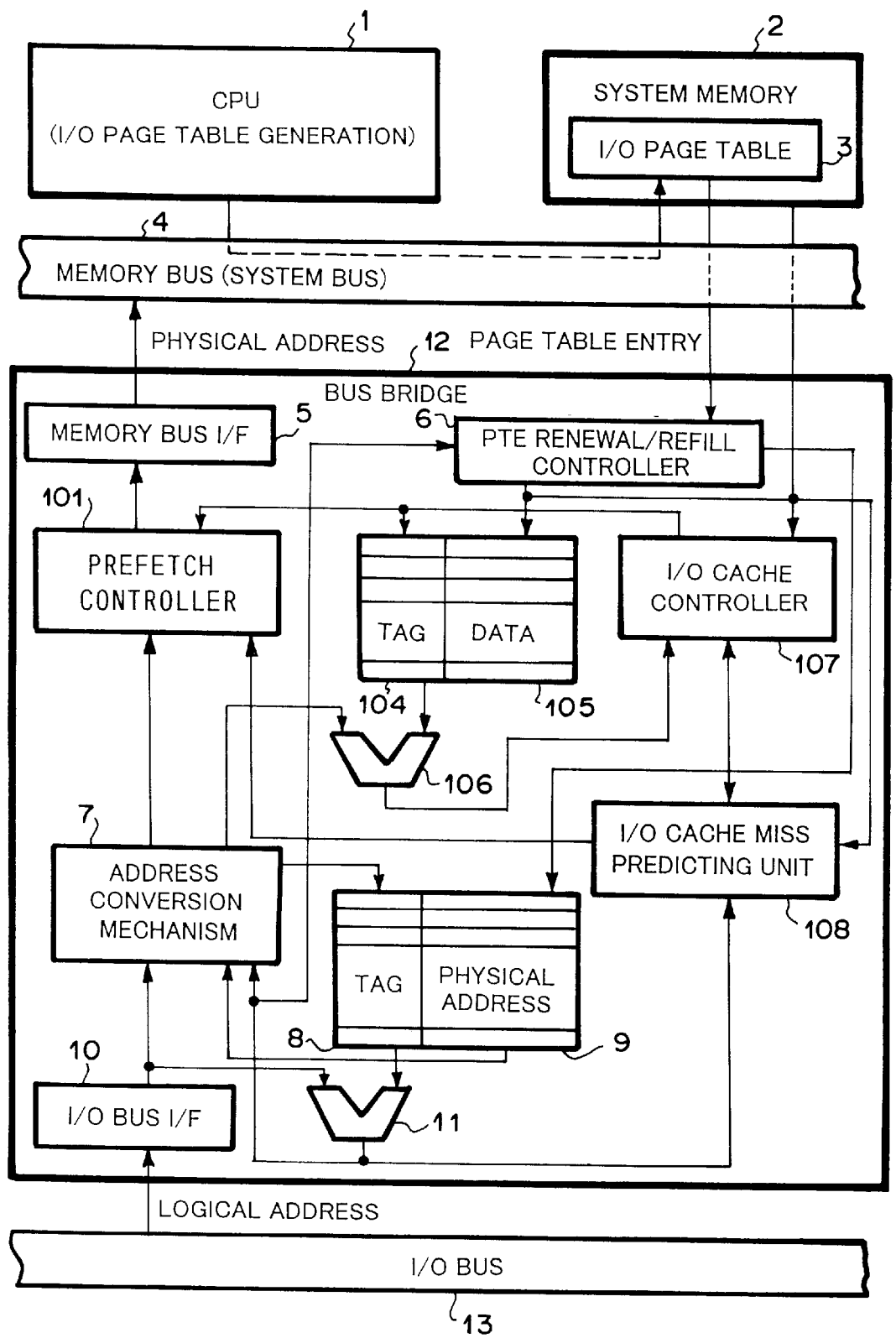
FIG. 7 is a diagram showing the construction of a second embodiment of the present invention.

Preferred embodiments according to the present invention will be explained hereunder with reference to the accompanying drawings.

A first embodiment of the present invention shown in FIG. 1 has the basic construction of the present invention.

Prior to description of the preferred embodiments according to the present invention, terms used in the following description are defined as follows, and the details of the preferred embodiments will be explained on the basis of the following definitions.

Bus bridge: this is defined as a hardware mechanism for mutually receiving/transmitting data from/to (communicating data with) a memory bus (or called as "system bus") connected to a system memory, a CPU, etc. and an I/O bus connected to a disc adapter, a communication adapter, a graphics adapter, etc. The bus bridge is generally called as a bus bridge or a host bridge, and in the following embodiments, the term "bus bridge" is used.

I/O-TLB: this is a mechanism having an address conversion function like a TLB mechanism which is generally used in CPU. The logical address is defined as an address on the I/O bus at which an I/O device accesses a memory resource or the like on a memory bus, and this mechanism converts the logical address to an address on the system memory (physical address) according to I/O-TLB in the bus bridge.

DMA (Direct Memory Access): in a personal computer, this generally means that the I/O device which cannot perform any memory access by itself indirectly carries out the memory access with the assistance of a hardware which is called as a DMA controller and takes over the memory access. However, in the following embodiments, it is defined as an operation in which the I/O device itself directly issues a request to the I/O bus to make a memory access as it originally means. This mechanism is called as "bus master operation" in a personal computer.

Logical DMA: when an I/O bus address is defined as a logical address by the logical address/physical address conversion mechanism, logical DMA means DMA which is carried out on the basis of the logical address. As a comparison, physical DMA is defined as follows. When the logical address/physical address conversion mechanism is not used, an address on the I/O bus is not directly converted, and DMA is carried out on the basis of an access address on the memory bus (physical address), this is defined as physical DMA.

Returning to FIG. 1, the overall construction of this embodiment and the operation of each control block will be explained.

In this embodiment, CPU 1 has a function of generating by software I/O page table 3 which is stored in system memory 2. In a series of processing of a memory management system by programs or the operating system, before the DMA operation of the I/O device is carried out, I/O page table 3 is prepared on system memory 2, a start instruction of DMA is made to the I/O device, and responding to the instruction, the I/O device carries out DMA on the basis of an address which is programmatically designated. This request address is an address called as "logical address", and it is expected to be converted to a physical address by bus bridge 12. The system memory (the system memory is mapped onto the physical address space) is not accessed by the logical address. That is, the address map of I/O bus 13 and the address map of memory bus 4 are not the same. The access address of I/O bus 13 is called as the logical address, and the concept of the logical address is introduced in the DMA space as a virtual address space which is excellent in portability and can be managed without paying direct attention to the physical space on the user program.

In this embodiment, this conversion is based on a system for mapping the DMA space to the actual physical space according to the I/O-TLB mechanism or an address remapping mechanism as explained later in the hardware (bus bridge) on the basis of an instruction of a memory management portion of an operating system.

The bus bridge has the following advantages. That is, when the addressing range of the I/O device is narrower than memory bus 4, a direct access (DMA) can be made to an address range higher than that of the I/O device by performing the logical address/physical address conversion in address conversion mechanism 7. Further, the TLB of CPU 1 and the I/O-TLB can be collectively managed as logical addresses, and thus the portability on the software is excellent. Still further, it is unnecessary that a user program operating on the operating system performs a memory management with paying attention to the physical space. In addition, in the case where data attributes of I/O bus 13 are needed in the data transfer operation from I/O bus 13 to memory bus 4 and data swap (byte swap, word swap, etc.) is needed in the endian of the bus system, such swap attributes can be defined every page of the I/O-TLB or the address remapping function. Therefore, there does not occur such an overhead that after the I/O device carries out DMA, CPU 1 reads data from system memory 2, programmatically converts swap information, and then stores the converted swap information in the memory again.

FIG. 2 shows this situation by using an address map. In FIG. 2, the address map at memory bus 4 side (physical address space 23) and the address map at I/O bus 13 side (the logical address space 21) are completely separately managed from one another. As explained above, the DMA from I/O bus 13 is mapped to the physical address space by address conversion mechanism 7, and FIG. 2 shows that address conversion mechanism 7 is implemented by two systems. One system is the I/O-TLB mechanism 22, and the other system is address remapping spaces 24, 25 and 29. These spaces are partitioned by logical address spaces indicated by I/O-TLB spaces 26, 27, 28 and 30 of FIG. 2. The arrangement of these spaces is arbitrarily determined, and it is programmatically determined by tag addresses in I/O page table 3. Further, The address range of this space is set to a fixed value called as "I/O page size" and has an entry number relied on a hardware resource. The entry number and the page size are out of the present invention. Likewise, the address range of the address remapping space is set to a fixed value, and has an entry number relied on a hardware.

Both are the same from the viewpoint of the function of converting the logical address to the physical address, however, different from each other in conversion method and entry renewing method. The detailed description thereof will be explained later with reference to FIG. 3.

Before this description, a manner of performing the address conversion on the logical address in I/O bus 13 by bus bridge 12 of the present invention will be explained with reference to FIGS. 1 and 3.

The DMA request on I/O bus 13 is based on the logical address (step 41 in FIG. 3), and bus bridge 12 has a function of judging whether the logical address is in the management address thereof (steps 42, 43 in FIG. 3). This is performed as follows. First, it is checked in address conversion mechanism 7 whether the logical address is within the address range to be originally managed by bus bridge 12. Subsequently, when it is within the address range, because bus bridge 12 must convert the logical address to the physical address (steps 45, 47 in FIG. 3), it is checked in logical address hit/miss check unit 11 whether the logical address is within the address range which is managed by the address remapping mechanism held as the address tag (whether it is hit) (step 43 in FIG. 3).

Here, the address judgement is first carried out in the address remapping mechanism because it is assumed that the address remapping mechanism uses only a part of the address conversion mechanism indicated by logical address tag 8 and physical address 9, and the logical address range (page) converted by the address remapping mechanism is not normally renewed once it is set at the stage where the system is started. That is, since the renewal is not performed, the logical address which accesses the address range under the address remapping mechanism is immediately converted to a physical address through the address remapping mechanism, and no conversion miss occurs. Accordingly, in compensation for non-occurrence of a miss, it has only an entry number which is dependent on an internal resource of bus bridge 12, and thus the upper limit of the logical address page is restricted.

In compensation for the merit in performance for the logical DMA due to no miss, there is a limitation to the upper limit of the logical page number dependent on the internal resource of the hardware in the address remapping mechanism has only the logical address page whose number is limited, that is, only a limited number of logical address pages are provided, and thus the portability on the software is deteriorated. However, in an actually assumed system, the DMA operation is dependent on a program, and various I/O accesses are operated in parallel and asynchronously. Accordingly, it is difficult to beforehand reserve address remapping pages whose number is sufficient to the above operations.

Therefore, as in the case of TLB in CPU 1, an address conversion mechanism which is called as I/O-TLB is used in combination. Accordingly, I/O page table 3 of I/O-TLB is located on system memory 2, and a conversion table entry (referred to as "PTE") needed on this page is prepared before the DMA is started. If there is provided a refilling operation function of automatically looking up I/O page table 3 in system memory 2 when I/O-TLB miss occurs in the bus bridge, it is satisfied in fact that there is no upper limit of the entry number in the I/O-TLB mechanism. That is, in the address conversion mechanism 7, if it is judged in the tag check of the address remapping (step 43 of FIG. 3) that the logical address is out of the address range, the hit check (step 44 in FIG. 3) on the basis of the I/O-TLB mechanism is carried out. If "hit" is checked, address conversion mechanism 7 converts the logical address to the physical address (step 46 of FIG. 3), and carries out the data transfer to the memory bus through memory bus I/F 5.

On the other hand, if "miss" is checked, PTE renewing/refilling controller 6 loads the missed I/O page table entry (PTE) in I/O page table 3 indicated by the pair of the base address held in address conversion mechanism 7 and offset address included in a logical address (step 48 in FIG. 3). The number of bits of the offset address is determined by the size of an I/O page. The detailed address calculation method thereof will be explained later.

PTE renewing/refilling controller 6 registers the PTE thus loaded as a physical address or as an entity of PTE while setting the logical address missed as a new entry (step 50 in FIG. 3). This operation is the same as a miss load operation due to a cache miss or a tag renewal operation. At this time, since a limit is imposed on the resource in bus bridge 12, it is needless to say that push-out of entries is carried out as in the case of the cache and the TLB of the CPU. This pushout and renewal function is carried out by PTE renewing/refilling controller 6. Further, the entry number is determined in consideration of the construction and performance of the I/O device as the system and the cost, and out of the present invention.

Next, the operation of FIG. 3 will be explained step by step again.

In step 41, the access is started on the basis of a logical address from the I/O bus. In step 42, the range of the logical addresses is checked. In step 43, an address remapping tag is checked. In step 44, a hit check of I/O-TLB is carried out, and if "miss" is checked, a refilling operation of the I/O-TLB is carried out to generate a refill address in step 46. Subsequently, in step 48, a load access to PTE missed is started, and in step 50, PTE which is loaded due to the miss is saved to renew the internal table. In step 51, the transfer of DMA data is completed.

On the other hand, in step 45, the logical address/physical address conversion is carried out. When "hit" is checked in step 44, the logical address/physical address conversion is carried out in step 47, and the transfer of the DMA data is completed in step 49.

Next, an embodiment of the actual logical address/physical address conversion will be explained with reference to FIGS. 4 and 5.

FIG. 4A is a diagram showing an example of the address conversion when the address conversion mechanism based on I/O-TLB is used. Here, I/O bus 13 is on the assumption of a 32-bit address space (reference numeral 61 of FIG. 4), and one page is assumed to be 8KB and designated a virtual page number (hereinafter referred to as "VPN") of 8KB. Accordingly, higher 19 bits of the address are defined as VPN, and lower 13 bits of the address are defined as an offset address. That is, the VPN of 19 bits represents an I/O-TLB page, and the I/O-TLB page and the I/O-TLB tab (reference numeral 8 of FIG. 1) in bus bridge 12 are compared with each other in logical address hit/miss check unit 11. Here, in consideration of the portability of the software, the page size of I/O-TLB is preferably set to the same size of the TLB size in the CPU which is used in the system.

If "hit" is checked after the comparison, the physical address after the conversion in bus bridge 12 is stored as PTE in physical address area 9 of FIG. 1. At the time of the comparison, not only the address comparison is performed, but also a validity bit V representing whether the PTE is valid or invalid is stored while paired with PTE information as indicated by reference numeral 66 of FIG. 4A. If the validity bit V represents "invalidity", "miss" is judged.

Next, a way to generate an actual physical address will be explained with reference to FIG. 4B.

As explained above, a physical address which is hit as a tag address at the portion of VPN is looked up. In this case, the offset address (reference numeral 62 in FIG. 4A and reference numeral 68 in FIG. 4B) is stored as a lower address of the physical address, and it is not a target to be converted. After the corresponding physical address is looked up on the basis of VPN, the logical address corresponding to the VPN is replaced by PTE which is looked up in the tag address hit, and then the physical address is generated. Accordingly, no conversion is carried out on the lower address in the same page (that is, in the same PTE), and in-page address is parallel mapped from the logical address to the physical address in the logical address/physical address conversion.

Further, a way to generate a PTE refill address in the case of I/O-TLB miss hit will be explained with reference to FIG. 5. The logical DMA looks up I/O-TLB out of the range of the address remapping mechanism, that is, within the address range of the I/O-TLB mechanism. If a miss occurs at this time, PTE missed must be refilled from I/O page table 3 because the PTE (physical address) in bus bridge 12 is obtained by copying a part of I/O page table 3 on system memory 2. If there is provided a mechanism for automatically performing by hardware an operation to determine which address of memory bus I/O page table 3 starts from and which of I/O page table 3 missed PTE is refilled from in case that refilling is performed, an efficient programming can be performed without paying attention to the miss/hit from the software to the I/O-TLB. That is, in such a system that if "missy" occurs, it is notified to CPU 1 every time "miss" occurs, and CPU 1 instructs the memory bus 4, a half of the merit of the portability to the software of the logical DMA system is lost.

Therefore, a method for automatically performing the refilling operation will be explained with reference to FIG. 5. Address conversion mechanism 7 of FIG. 1 has a register (reference numeral 81 in FIG. 5) for storing a base address of I/O page table 3 which is needed in the refilling operation.

This register itself is normally once set on the basis of system information such as the capacity of a mounted memory of the system, the types and total number of connected devices by the operating system when the system is started. Assuming that the page size of I/O-TLB is 8KB, the bits are shifted and added so that bits 10 to 18 of VPN (reference numeral 82 in FIG. 5) and bits 0 to 8 of the page table base address (reference numeral 81 in FIG. 5) are matched, thereby generating a refill address of PTE. That is, the page table address represents where the I/O page table is located in the system memory space in the unit of 8KB (I/O page size itself), and PTEs (physical address itself) are successively stored in the unit of 8 byte per VPN page. The above address calculation method may be freely modified in accordance with the construction of the system, and the calculation method itself is out of the present invention.

Next, a logical address/physical address calculation method in the case of the address remapping will be explained with reference to FIG. 6.

The I/O-TLB page size of FIG. 6 is assumed to be 16MB. By owning plural pages, plural logical spaces (16MB) serving as conversion targets can be provided in plural address remapping mechanisms, and the number of the logical spaces is out of the present invention. Further, as in the case of I/O-TLB, the logical DMA space is assumed to be 32 bit addressing, and the physical address space is assumed to 36 bit addressing.

As shown in FIG. 6A, higher 8 bits of the logical address is defined as an address remapping page number (reference numeral 91 in FIG. 6A, reference numeral 95 in FIG. 6B), and by comparing this portion with a remapping address base (reference numeral 92 in FIG. 6A) in the bus bridge, it is checked in an address comparator (reference numeral 93 in FIG. 6) whether the logical address is within the remapping page or not. If "hit" is checked (that is, it is a logical address within the remapping address), a physical address is generated as explained later with reference to FIG. 6B. If "miss" is checked, as show in the flowchart of FIG. 3, the hit check is carried out in I/O-TLB. Here, in common with the case of I/O-TLB, hit/miss is finally determined by V bits (reference numeral 94 in FIG. 6A) representing whether the remapping page is valid or invalid.

Next, the generation of a physical address of FIG. 6B will be explained.

In common with the case of the logical address/physical address conversion by I/O-TLB, an address below the page size is directly mapped as an offset address (reference numeral 97 of FIG. 6) to the physical address space. On the other hand, an address above the page size is replaced by an address remapping segment (reference numeral 96 in FIG. 6B). Thus, physical address (reference numeral 98 in FIG. 6) is generated.

As is apparent from the foregoing explanation, according to the bus bridge of the present invention, the performance-reduction effect on the system which is caused by occurrence of a miss in the logical address/physical address conversion can be suppressed at maximum while ensuring the portability on the software.

A second embodiment of the present invention will be explained with reference to FIG. 7. The second embodiment shown in FIG. 7 is implemented by enhancing the performance of the logical DMA of the system bus bridge in the first embodiment shown in FIG. 1. Particularly, the differences from the first embodiment will be mainly explained in detail.

In FIG. 7, CPU 1 generates I/O page table 3 stored in system memory 2 as in the case of the first embodiment. The I/O device carries out the logical DMA on the basis of a logical address which is programmatically indicated as in the case of the first embodiment. As in the case of the first embodiment, when I/O-TLB is used, I/O page table 3 is looked up every time system bridge 12 misses, and I/O-TLD is converted to a physical address to thereby performing DMA.

The second embodiment differs from the first embodiment in that a logical address conversion mechanism is applied to bus bridge 12 having an I/O cache to enhance not only the =throughput performance of memory bus 4, but also the logical DMA performance. As in the case of the cache in CPU 1, the I/O cache temporarily receives a DMA access to prevent a DMA transfer shorter than the cache line size from being output to memory bus 4 by mounting in bus bridge 12 a copy of system memory 2 on memory bus 4 of a write-back protocol, whereby the usage efficiency of memory bus 4 (the number of bytes which can be transferred per unit time) is enhanced, and the throughput performance of memory bus 4 is enhanced. That is, with respect to the usage efficiency of memory bus 4, if the system is optimized so that an access is made at the same cache line size at all times between nodes connected to memory bus 4, the use efficiency is maximally enhanced.

Further, in the DMA device, even when DMA smaller than the half of the cache line size is carried out, it can be expected that a second access is hit although a first access suffers an I/O cache miss because the DMA is usually carried out by a sequential address. Accordingly, even when an I/O cache is introduced in consideration of the throughput performance of memory bus 4, the DMA performance can be enhanced in many cases, and thus there is a case where an I/O cache is introduced in a computer server system at the high end.

However, there is a case where most of the I/O cache is missed, and in this case the I/O cache refilling operation is started due to the I/O cache miss, resulting in occurrence of a deterioration disadvantage of the transfer performance. Further, in the case where the logical DMA mechanism proposed by the present invention is used in combination, it is feared that both an I/O-TLB miss and an I/O cache miss occurs when the logical DMA access operates in the I/O-TLB mechanism. Accordingly, it is a great requirement to reduce these losses as much as possible.

The second embodiment of the present invention has an object to suppress the deterioration of the DMA transfer performance irrespective of occurrence of both of an I/O-TLB miss and an I/O cache miss due to a cooperating operation mechanism of the I/O-TLB and the I/O cache when the I/O cache is introduced mainly to enhance the throughput performance of the memory bus in the bus bridge in which the logical address conversion mechanism is introduced.

The details of the second embodiment will be explained with reference to FIG. 7.

The logical address from I/O bus 13 (in the case of the logical address space by the I/O-TLB) is sampled and held by memory bus I/F 10 according to the I/O bus protocol, and compared with logical address tag 8 in logical address hit/miss check unit 11 to judge "hit" or "miss". This result is delivered to address conversion mechanism 7 as in the case of the first embodiment. However, in the second embodiment, this information is also transferred to I/O cache miss predicting unit 108. When "hit" is judged in logical address hit/miss check unit 11, address conversion mechanism 7 looks up a physical address from physical address 9. If "miss" is judged in logical address hit/miss check unit 11, as in the case of the first embodiment, PTE is refilled from I/O page table 3 on system memory 2 to look up (pull) a physical address, stores a missed logical address as a new tag into logical address tag 8, and stores refilled PTE into physical address data unit 9.

Thereafter, whether the address converted to the physical address hits or misses the I/O cache in bus bridge 12 is checked on the basis of comparison between I/O cache tag 104 and the physical address in I/O cache address comparator 106. In the case of the I/O cache hit, data are supplied from I/O cache data unit 105 and then delivered to the I/O device. However, in the case of the I/O cache miss, the cache refill is needed as in the case of the I/O-TLB miss, and data are loaded from system memory 2 and also the data are stored into I/O cache data unit 105.

As is apparent from this operation, if "hit" is made in the logical address/physical address conversion mechanism and also "hit" is made in the I/O cache, the conversion can be performed at high speed with taking full advantage of the logical address. If "hit" is further made in the I/O cache, a response to a request from an I/O device can be performed at a high speed.

However, in accordance with the operation state of the system or the behavior and construction of the I/O device connected to I/O bus 13, there may occur a case where "miss-hit" occurs in the logical address/physical address conversion mechanism and further "miss-hit" occurs in the I/O cache. Particularly, there occurs a case where the upper limit of the performance is suppressed more strongly by the transfer latency (the time period from transfer request until supply of first data to a data requester) than by the transfer throughput (the amount of data which can be transferred within a fixed time) for devices of communication system/multimedia system. In this case, under the influence of the combinational use of the logical address/physical address conversion mechanism and I/O cache mechanism and of other connected devices, the miss-hit of both the mechanisms may frequently occur, and thus the performance may be rather reduced.

Therefore, in the second embodiment of the present invention, the probability of miss of the I/O cache is improved by predicting the miss of the I/O cache rather than both of the miss of the logical address/physical address conversion mechanism and the miss of the I/O cache is improved by increasing the amount of resource (entry number).

Next, a predicting mechanism will be specifically explained with reference to FIG. 8.

If I/O-TLB in the logical address/physical address conversion makes a miss-hit (step 111 of FIG. 8), the refill operation of I/O-TLB PTE (step 112 of FIG. 8) is started to refill matched PTE from I/O page table 3 on system memory 2. The miss go z of the I/O-TLB means that a new DMA is started. Since the new DMA is started, the address of the DMA is a sequential address in the I/O-TLB, and the operation of looking up the I/O cache is executed after conversion to a physical address. This physical address can be predicted to be a new sequential address. Accordingly, it is natural to predict that the probability of occurrence of a miss is also very high in the I/O cache.

Further, it can be expected that with this I/O-TLB miss as a trigger, a DMA request occurs at a sequential address until a fixed amount of data are transferred. Accordingly, with this I/O-TLB miss as a trigger, the request occurs with sequential physical addresses taking the first physical address as a start address. As explained above, the page size of I/O-TLB is much larger than the I/O cache size, and thus there can be sufficiently established such a prediction system that if I/O-TLB makes amiss and then the I/O cache makes a miss, a series of DMA is started and an address line next to a cache line missed by the I/O cache is subjected to DMA request with a high probability.

The second embodiment uses this prediction system. Explaining briefly, in this system, operation of loading data of two cache lines is triggered by occurrence of both of the first I/O-TLB miss and the I/O cache miss. Here, it should be considered that two I/O cache lines must be ensured to load data of two lines. If the tag attributes of these two I/O cache lines are dirty, a write-back operation to push out the cache of the two lines occurs, and a transfer loss may occur. Accordingly, in order to suppress the loss, pre-load for prediction is not carried out when a push-out pointer is a dirty line, and only the load of the I/O cache miss is carried as normally carried out (steps 113, 114, 117, 119, 121 in FIG. 8).

However, there can be performed such a control operation that if the address which is not dirty and is to be pre-loaded for the prediction does not exist in the I/O cache tag (steps 114, 115 in FIG. 8), the pre-load is carried out (steps 116, 118, 120 in FIG. 8), and if a DMA request is made on the basis of the pre-load address, I/O cache is carried out.

The above operation will be explained step by step again.

Figure 8:
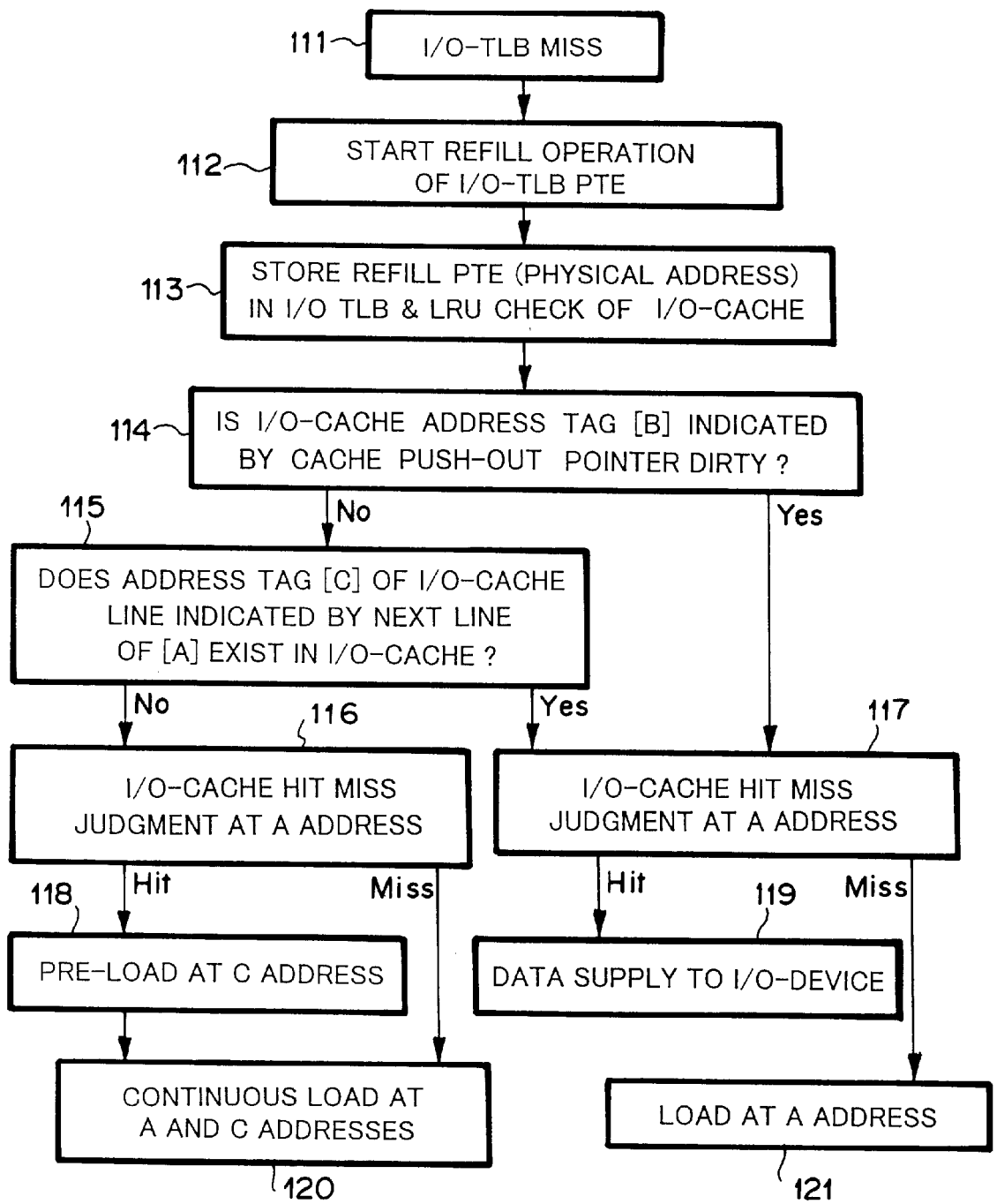
FIG. 8 is a diagram showing an operation flow to explain an I/O cache miss predicting mechanism in the second embodiment.

If an I/O-TLB miss occurs instep 11 of FIG. 8, the I/O-TLB refilling operation is started in step 112. In step 113, LRU of the I/O cache is checked while storing the refill PTE, and in step 114, the attribute of a target tag of the I/O cache to be pushed out is checked. If the tag is dirty, it is checked in step 115 whether a line address next to the address refilled in step 115 exists in the I/O cache, and in step 116, the hit check of the I/O cache is carried out on the basis of the I/O-TLB miss address. Subsequently, in step 118, there-load is carried out on the basis of a line address next to the refilled address, and in step 119, the load is continuously carried out on the basis of the I/O-TLB-missed address in step 119 and the next cache line address thereto.

In step 117, the hit check of the I/O cache is carried out on the basis of the I/O-TLB-missed address, and in step 119, DMA data are supplied to the I/O device. Further, in step 121, the loading is carried out on the basis of the I/O-TLB-missed I/O cache line address.

Next, a third embodiment according to the present invention will be explained.

It may be assumed that the third embodiment has the same bus bridge construction as the first embodiment. However, this embodiment is different from the first embodiment in the following operational point. That is, in the refilling operation of an I/O-TLB-missed logical address of the third embodiment, with respect to the saving operation of the refilled PTE, the PTE renewing/refilling controller (reference numeral 6 in FIG. 1) is made to perform a control operation of simultaneously setting not only an actually-missed PTE, but also plural PTEs, and then preparing a TLB entry used in a subsequent logical address. Therefore, no miss occurs at the break between DMA pages in the logical DMA for transferring data of plural pages over the continuous I/O-TLB page size, and thus the transfer performance of a device for which the throughput performance is important can be kept.

Next, the details of the third embodiment will be explained with reference to FIG. 9.

Figure 9:
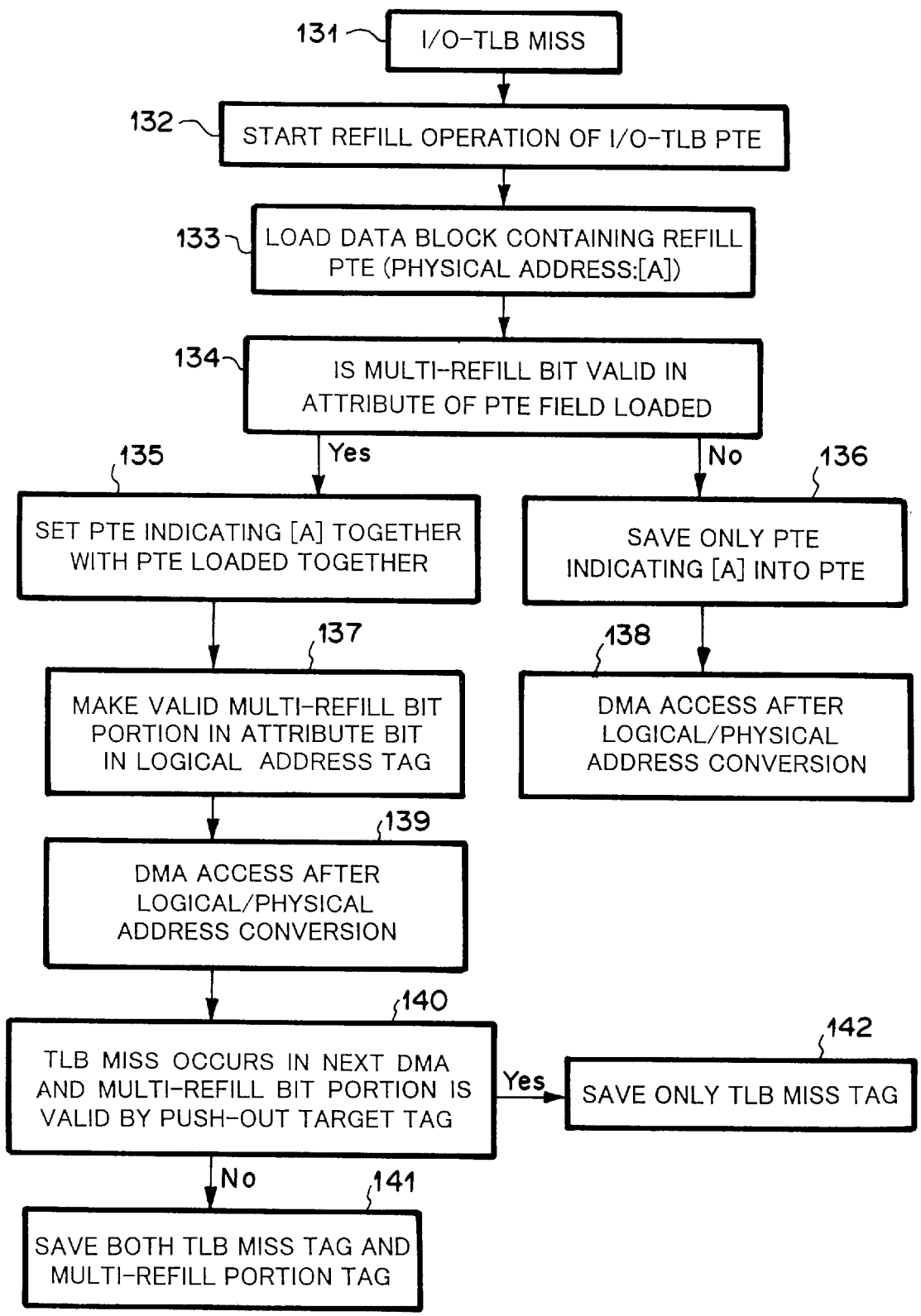
FIG. 9 is a flowchart showing the operation of the third embodiment of the present invention.

When the I/O-TLB makes a miss in the logical DMA using I/O-TLB (reference numeral 131 in FIG. 9), the refilling operation for missed PTE is carried out (reference numeral 132 in FIG. 9). This refilling operation is apparently the same as the normal reading operation (reference numeral 133 of FIG. 9), and the read data size is assumed to be 64B on the assumption that it is carried out on a cache size basis. Accordingly, the PTE refill contains only the address information and the attribute information thereof although it is dependent on the PTE size, and thus it is sufficient to assume the PTE size to be about 8 bytes. The memory bus which puts emphasis on the throughput introduces such an I/O cache as shown in the second embodiment in many cases in order to avoid reduction in throughput performance of the memory bus which is caused by transfer of data of a relatively short byte number from an I/O device or the like onto the memory bus. In the third embodiment, although no explanation will be made on this point, the memory bus is made on the assumption that access is carried out with cache line size (in this case, it may be the cache line size of CPU), and thus even PTE refill of about, 8 bytes may bring needless data which are appendant to the 8 byte data. Actually, this needless data is brought from the I/O page table, and thus it is frequently PTE for another logical address. However, as is the case of the first embodiment, it is a normal case that only the actually-missed PTE is used.

Figure 10:
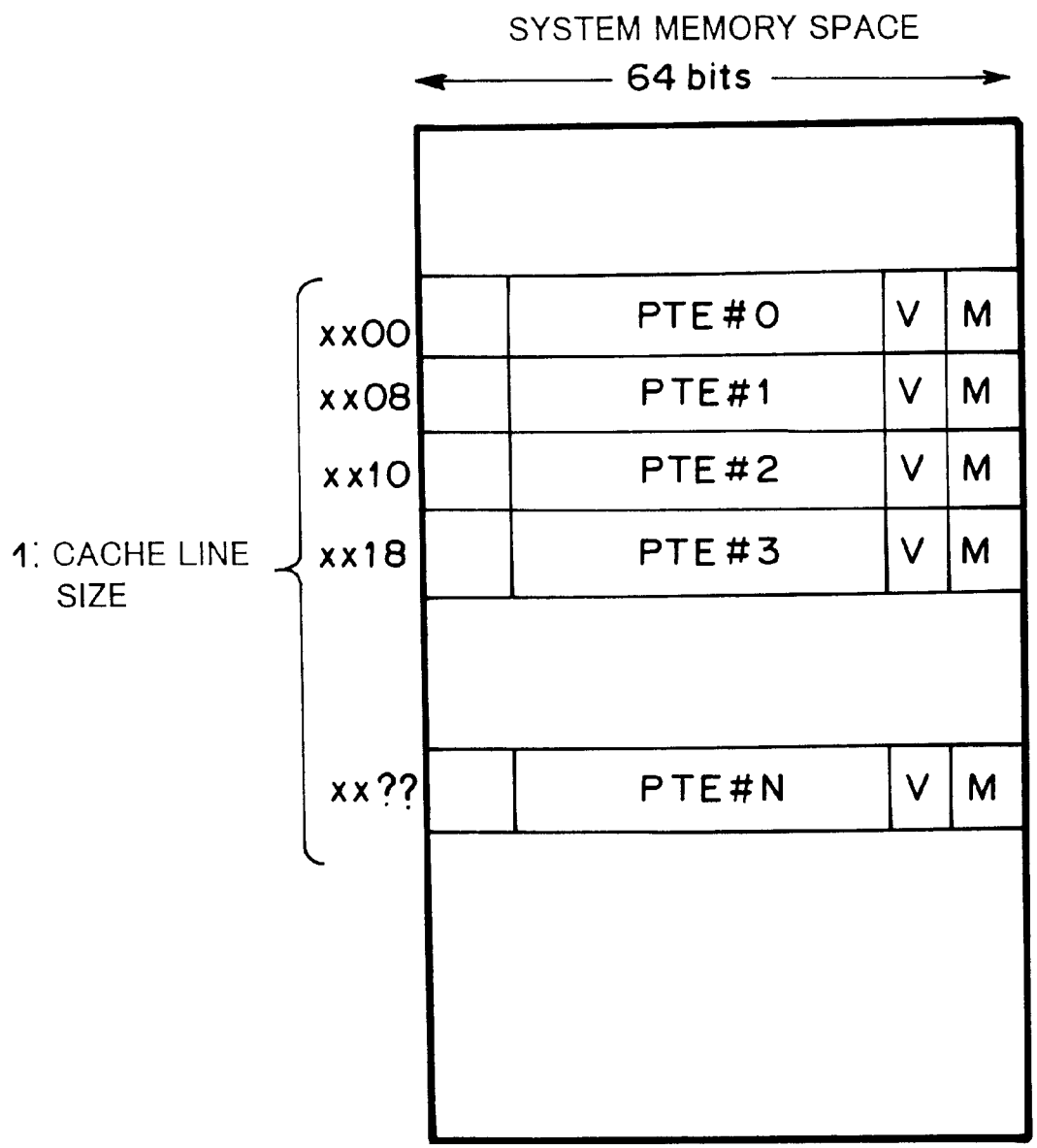
FIG. 10 is a diagram showing the construction of an I/O page table in the third embodiment of the present invention.

Therefore, since needless data are brought in addition to PTE which is refilled due to an actual miss, the probability of the TLB miss could be reduced even in the logical DMA system based on I/O-TLB if the I/O page table is prepared on the software so that the needless data are actually used as PTE. Therefore, a multi-refill bit (M-bit) is prepared in addition to a conventional validity bit (V-bit) in the attributes of the I/O page table as shown in FIG. 10. This M-bit in the PTE attribute thus refilled is checked (step 134 in FIG. 9), and if this bit is valid, the PTE refilled at the same time is held together (step 135 of FIG. 9). At this time, when the I/O page table is prepared by an operating system or a driver software, the arrangement of the I/O page tables is set so as to be continuous like the logical addresses across the range where M-bits are continuously valid. With this arrangement, when entries following the missed PTE set as origin are provided with M-bits, the I/O-TLB pages are set to be continuous like the logical addresses. Further, when PTE refilled is held, this M-bits is also saved (step 137 in FIG. 9).

Thereafter, the logical address/physical address conversion is carried out by using the refilled PTE, and the logical DMA access is completed (step 139 in FIG. 9). A TLB miss occurs in a next DMA, and in order to renew TLB, it is checked whether the attribute of a target tag to be pushed out is M-bit validity (step 140 of FIG. 9). If the target TLB tag to be pushed out is M-bit validity, only the actually TLB-missed tag is saved, and tags which are simultaneously refilled and whose M-bit attribute is valid are not saved (step 142 in FIG. 9).

When the M-bit validity is satisfied for the target TLB tag to be pushed out due to refill, this tag is saved because it is used as one of continuous pages. In the case where the attribute of the push-out target is M-bit, another TLB tag may be further renewed if the PTE refilled simultaneously is saved in addition to the push-out operation. If the renewal is carried out, two or more TLB tags may be temporarily extinguished from the bus bridge by the push-out and the renewal. When plural I/O devices operate simultaneously, they eat TBL entries each other through the multi-refilling operation, and finally the probability of the TLB miss may be increased. That is, even when M-bit is valid, only the actually-missed PTE is held if the push-out target is M-bit, whereby the probability of such slashing on the TBL entry is reduced. Thus, the effect of the multi-refilling can be prevented from being suppressed.

In the case where the push-out target is not M-bit validity, if an effective renewing algorithm such as LRU (Least Recently Used) is used as the push-out algorithm, the TLB entry to be pushed out represents, in this sense, that the logical DMA of one page has the lowest usage frequency. In other words, the DMA using that page can be judged to be completed from the fact that the page has not been recently used. Therefore, not only the PTE to be refilled, but also the PTE which is simultaneously loaded are set to an entry portion which is a next push-out target (step 141 in FIG. 9).

The above operation will be explained step by step again.

In step 131, after power-on reset, an I/O-TLB miss occurs. In step 132, the PTE refilling operation due to the I/O-TLB miss is started. Subsequently, in step 133, table data containing refilled PTE are loaded. In step 134, it is checked on the basis of the attribute field of the PTE thus loaded whether the M-bit is valid. If it is valid, in step 135 the PTE which is simultaneously loaded together with TLB-missed PTE in step 135 is set. Subsequently, in step 137, M-bit information is also saved while a PTE entry group which is collectively loaded due to the TLB miss is registered as the corresponding logical address. In step 139, after the logical address/physical address conversion, the DMA access is carried out, and in step 140, it is checked whether a TLB miss occurs in a subsequent DMA and a push-out target is M-bit validity. If the M-bit is valid, in step 140, only the miss tag of TLB is saved. If the M-bit is invalid, in step 141, PTE which is simultaneously loaded together with the TLB miss tag is also saved.

On the other hand, if the M-bit is not valid in step 134, only the PTE which is missed in step 136 is saved. Subsequently, in step 138, the DMA access is carried out after the logical address/physical address conversion is carried out.

In the present invention, the number of PTE entries to be simultaneously set cannot be set to any value although the M-bit is added. That is, the number of PTE entries to be simultaneously set is a variable parameter which is dependent on the number of resources of the TLB entries contained in the memory bus and the number and characteristics of devices connected to the I/O bus, and it is needless to say that this parameter is out of the present invention. Further, the renewing algorithm is also out of the present invention.

Figure 11:
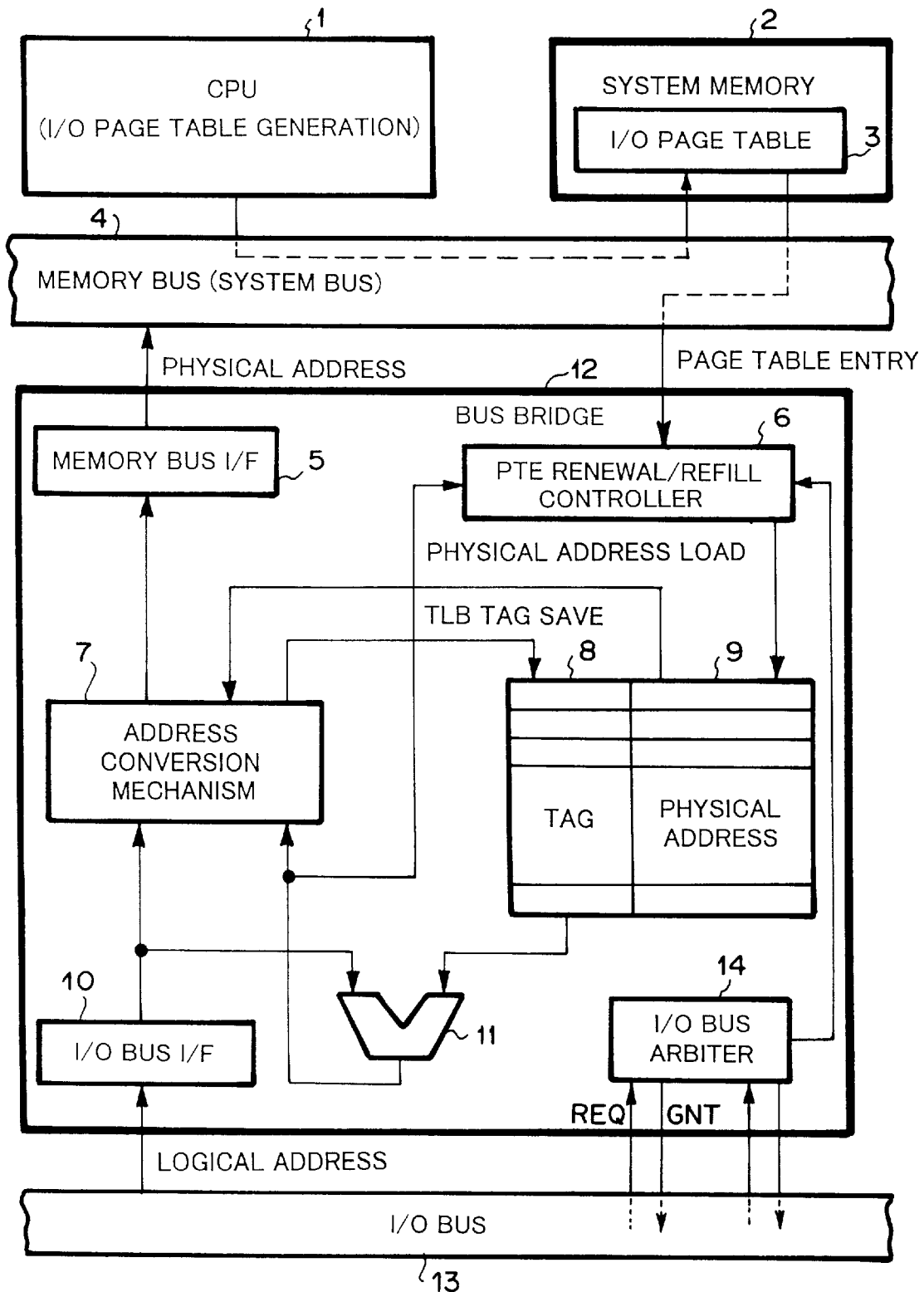
FIG. 11 is a diagram showing the construction of a fourth embodiment of the present invention.

Next, a fourth embodiment according to the present invention will be explained with reference to FIG. 11. The fourth embodiment is based on the construction of the first embodiment, and it aims to ensure the instantaneousness performance (latency performance) of the latency type device which has a relatively long time interval of DMA requests, but needs instantaneousness. The memory bus of this embodiment is characterized by having I/O bus arbiter 14. Taking the general construction of the memory bus into consideration, it is not a special case that the memory bus has I/O bus arbiter 14.

In the fourth embodiment of the present invention, information as to which I/O device carries out the DMA at present can be specified by examining by I/O bus arbiter 14 a request line REQ and a request permission line GNT which are provided to each I/O device. Therefore, the I/O-TLB resource can be separately managed for the latency type device. Various methods may be applied as a method for the separate management, and the way for assignment with I/O-TLB on a device basis is out of the present invention. However, according to such a method, the I/O-TLB of the latency type device is ensured at all times with no influence of the throughput type device, and thus the I/O-TLB miss can be prevented from occurring at more times than expected.

According to the present invention, the following effects can be achieved.

A first effect is as follows. The logical DMA mechanism is used, and the two different logical address/physical address conversion mechanisms can be selective and simply used in accordance with the area of the logical address space. Therefore, irrespective of the addressing restriction of the I/O device, not only the DMA transfer can be performed, but also the high speed address conversion and the flexibility and unity on software can be achieved. Accordingly, the address conversion can be performed at a high speed while the flexible management of the DMA address space in the DMA transfer can be enabled, so that the deterioration of the transfer performance due to the address conversion can be greatly reduced. This is because the address remapping mechanism is used in combination with the logical DMA mechanism based on I/O-TLB and thus they can be easily selectively used in accordance with the access range of the logical space.

A second effect is as follows. The logical DMA mechanism having the first effect is adopted, and the I/O cache mechanism is used in combination. Further, both the mechanisms are operated not separately, but in cooperation with each other, whereby the effect of the simultaneous concurrence of the I/O-TLB miss and the I/O cache miss on the transfer performance can be greatly suppressed. Accordingly, the deterioration of the performance due to the simultaneous concurrence of the I/O-TLB miss and the I/O cache miss hit can be suppressed at maximum while the flexible management of the DMA address by the logical DMA mechanism can be enabled and the high-speed logical DMA transfer by the I/O cache hit can be kept. This is because the probability that I/O cache misses occur continuously can be reduced by introducing the mechanism for predicting the miss of the I/O cache when the I/O-TLB miss occurs.

A third effect is as follows. As is apparent from the third embodiment, the throughput performance of the I/O device which carries out the logical DMA by using plural logical pages can be ensured by refilling plural PTEs by I/O-TLB and newly providing the M-bit in these PTEs. The reason for this is as follows. That is, the attribute of "M-bit" is defined in the attributes of I/O-TLB, and if this is valid, it is suggested that plural logical pages are linked to one another to perform the logical DMA, so that PTE of continuous logical pages can be loaded and stocked by the one normal TLB miss.

A fourth effect is as follows. As is apparent from the fourth embodiment, even when the latency type device and the throughput type device coexist, the I/O-TLB entry is not occupied by the throughput type device, and thus the instantaneousness of the DMA access of the latency type device can be guaranteed. The reason for this is as follows. The I/O bus arbiter is provided in the bus bridge to specify the DMA device being currently executed, and the separate management is performed so that the I/O-TLB is not occupied by other devices, whereby the I/O-TLB can be ensured not being effected by the characteristic of the device.

What is claimed is:

1. A bus bridge for mutually connecting a memory bus having memories connected thereto and an I/O bus having plural I/O devices connected thereto, the bus bridge comprising:

a conversion table having pairs of entry and physical address, the conversion table divided into a fixed part and a refillable part;

an address conversion mechanism that converts a logical address supplied from said I/O device to a physical address supplied to said memory bus, the address conversion mechanism selectively using said fixed part or said refillable part in accordance with whether said logical address is in an address remapping space or in an I/O-TLB space; and a refill controller that refills the contents of said refillable part from a mother address conversion table on a memory when said logical address is in said I/O-TLB space and the entry corresponding to said logical address does not exist in said refillable part.

2. The bus bridge as set forth in claim 1, which further comprises an I/O cache for predicting a transfer address supplied from said I/O device towards said memory bus and holding the predicted necessary memory data in advance while cooperating with said address conversion means so as to enhance a hit rate of the I/O cache, said I/O cache having a copy of memory data on said memory bus and a coherency control function involved therein.

3. The bus bridge as set forth in claim 2, wherein said I/O cache comprises an I/O cache controller and an I/O cache miss predicting unit.

4. The bus bridge as set forth in claim 1, further comprising:

a means for simultaneously refilling conversion table entries other than the missed address conversion table entry which was not found in said refillable part of said conversion table in addition to the missed conversion table entry in the refilling process for looking up the missed conversion table entry from mother address conversion table on the memory.

5. The bus bridge as set forth in claim 1, which further comprises:

REQ/GNT monitoring means for monitoring request (REQ) lines and request permission (GNT) lines of said I/O devices; and a means for controlling the operation of updating said address conversion table on the basis of the information supplied from said REQ/GNT monitoring means, wherein said REQ/GNT monitoring means and said means for controlling co-operate to avoid any one I/O device having frequent misses which are caused by pushing out the address conversion table entry for that one I/O device executed by other I/O devices even when accesses by plural I/O devices are executed in parallel and the frequency of updating address conversion table is high.

* * * * *

UNITED STATES PATENT AND TRADEMARK OFFICE
CERTIFICATE OF CORRECTION

PATENT NO. : 6,128,684
DATED : October 3, 2000
INVENTOR(S) : Yoshimitsu OKAYAMA

It is certified that error appears in the above-identified patent and that said Letters Patent is hereby corrected as shown below:

Please note on front cover, item [54] Title of Invention delete "BUS BRIDGE" and replace with --BUS BRIDGE HAVING CONVERSION TABLE WITH A FIXED PART AND A REFILLABLE PART--.

Signed and Sealed this

First Day of May, 2001

Attest:

NICHOLAS P. GODICI

*Attesting Officer*  *Acting Director of the United States Patent and Trademark Office*